UNITED STATES PATENT OFFICE.

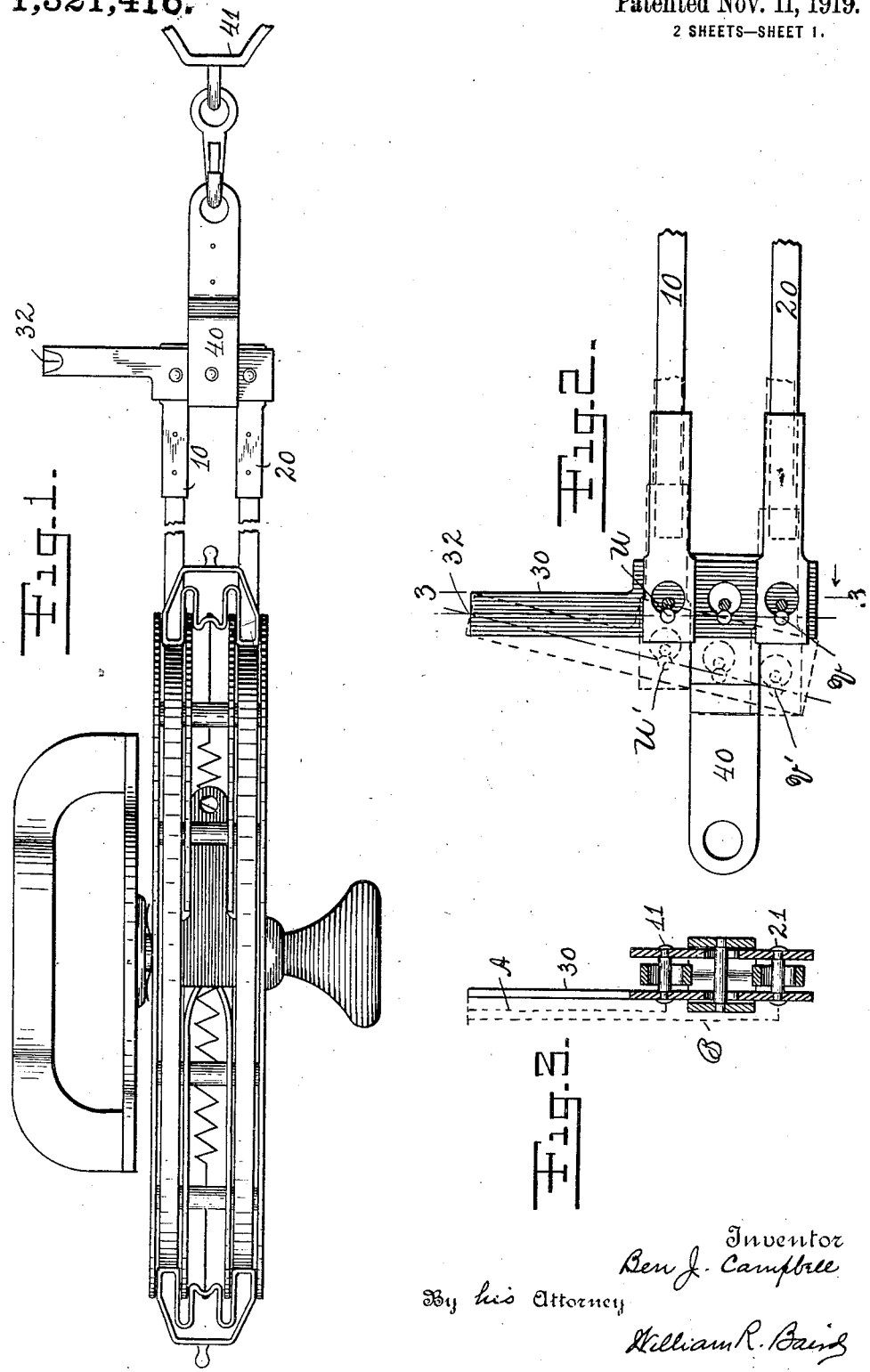

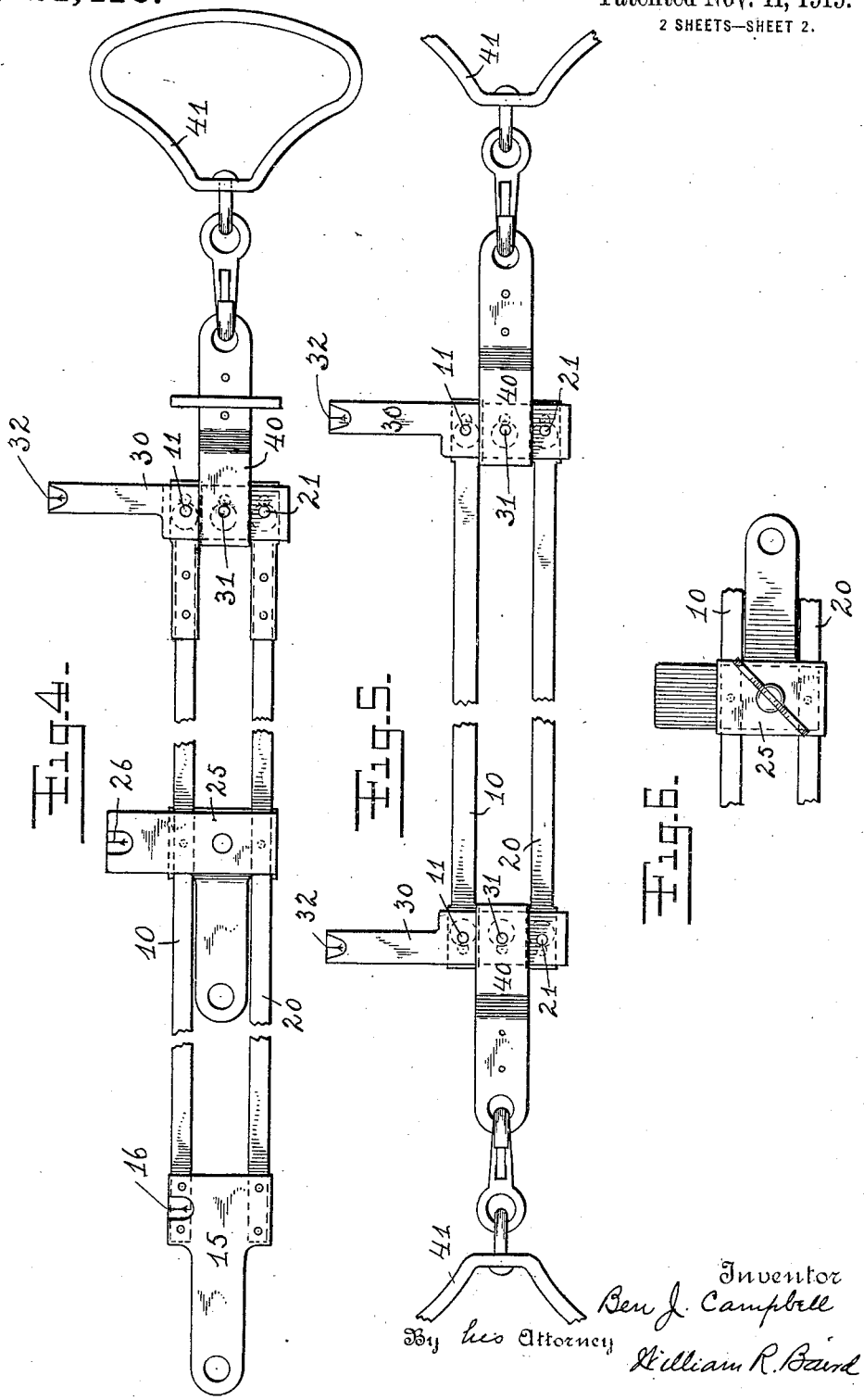

BEN J. CAMPBELL, OF HOBOKEN, NEW JERSEY, ASSIGNOR TO KEUFFEL & ESSER COMPANY, OF HOBOKEN, NEW JERSEY, A CORPORATION OF NEW JERSEY.

COMPENSATING TAPE.

1,321,416.  Specification of Letters Patent.  Patented Nov. 11, 1919.

Application filed March 22, 1916. Serial No. 85,770.

*To all whom it may concern:*

Be it known that I, BEN J. CAMPBELL, a citizen of the United States, residing at Hoboken, in the county of Hudson and State of New Jersey, have invented certain new and useful Improvements in Compensating Tape, of which the following is a specification.

This invention relates to linear measuring devices intended to be used in the accurate ascertainment of a linear distance having due regard to the effect upon the device of variations in length due to changes in temperature, changes in the amount of pull or tension upon the device, and in case it is composed of flexible elements, to changes in the sag or catenary as it may be supported either throughout its entire length or from a variable number of points.

It has long been desired to produce such a device in the form of a tape, but the desired result has been held to be an impossibility because an examination of the formulæ expressing the mechanical laws involved did not afford much encouragement that a solution of the problem might be accomplished.

An attempt has been made to solve the problem by the construction of the so called "invar" tape, which has a low coefficient of expansion, and in using it for ordinary measurements of length, the variations due to temperature changes may be regarded as negligible, but for really accurate measurements, such as are necessary in geodetic surveying, the effects of such changes must be taken into account and since there is no means of determining by the use of a thermometer even within a few degrees, what is the mean temperature of a tape lying on the ground, or at varying distances above the ground when the tape is wholly or partly in sunlight or shade, the correction for temperature is at best uncertain. In tapes of this "invar" class, as in ordinary tapes, the errors due to changes in tension, and to variations in catenary, are relatively large and are not satisfactorily taken care of.

In the invention hereinafter described, I believe I have solved the problem of producing a linear measuring device which is so arranged and constructed that automatically and without any attention of the user, it compensates for changes in temperature, changes in tension and changes in sag or catenary, with such a small resultant error that for all practical purposes, it may be regarded as completely negligible. Moreover, the device is simple to understand, and relatively easy to construct. It is based upon immutable principles and once made can hardly get out of order and at the same time may be used not only in locating a constant distance, but also in locating portions of such distance.

In brief, the invention consists of a device comprising two tapes made of different metals, arranged in parallel relation, rigidly or pivotally joined together at one end and pivotally joined together at the other end and provided with one or more compensators adapted to be jointly moved by the variations in the lengths of the two tapes under different conditions of temperature, tension and sag, due to inherent properties of the metals themselves, so that the distance from one end of the device to the other is constant.

In the drawings, Figure 1 is a side elevation of my improved measuring device showing it secured on a reel; Fig. 2 is an enlarged detail of the compensator showing a second position in dotted outline; Fig. 3 is a section on the plane of the line 3—3 in Fig. 2; Fig. 4 is a side view of the device showing a rigid connection for the tapes at one end and a pivoted connection at the other; Fig. 5 is a similar view showing pivoted connections at both ends; and Fig. 6 is a detail of the intermediate clamp.

In the drawings, 10 is a tape of suitable material, for instance steel, and 20 is another tape of different suitable material, for instance bronze. These are arranged in parallel relation and rigidly secured together at one end by a union indicated at 15, and which is provided with an index 16, said union and index constituting an indicating element. At the opposite end, the tapes are secured to a compensator 30, the tape 10 by a pivot 11 and the tape 20 by a pivot 21. The tapes are suitably spaced apart and intermediate the pivots 11 and 21 the compensator is pivoted to a link 40 at 31, and this link in turn has secured to it, the usual hand-hold 41. The compensator is provided with a projecting arm having an index 32, the arm and index constituting an indicating element.

The two tapes under varying conditions of temperature will change in length proportional to their relative coefficients of expansion, and this relative change will obviously be independent of either the length of the tapes or the extent of variation in the temperature, so long as both tapes are of the same length and subjected to the same changes, which will of course be the case when they are in parallel relation close to each other as in the device illustrated, and handled simultaneously. Supposing that the length of the line A, that is, the distance of the pivot 11 to the end of the index mark 32, is made proportionate to the coefficient of expansion of steel of the character used in the tape 10, and the length of the line B, that is the distance from the pivot 21 to the end of the index mark 32, is made proportionate to the coefficient of expansion of bronze of the character used in tape 20, then it is obvious that if the two tapes are simultaneously subjected to an increase in temperature, for instance, by exposing both of them to the sunlight, the bronze will expand say from a point indicated at V to a point indicated at V', and the steel will expand from a point indicated at U to a point indicated at U'. This will of course move the compensator, but the point 32 will not move; the compensator simply rotating around that point as a center. Therefore, notwithstanding the fact that the two members 10 and 20 of the device have moved, yet the linear distance from the mark 16 to the mark 32 has remained the same. If the temperature is lowered, as the bronze will contact to a greater extent than the steel, the compensator 30 will be swung in the opposite direction, but the position of the mark 32 will remain the same.

Disregarding from consideration, for the moment, the effect of changes of temperature, and supposing that the device is subjected to various tensions or pull, that is, supposing the union 15 were fixed and a pull of anywhere from one to fifty pounds were exerted upon the tapes, then it is obvious that the extent of stretch of the tapes would vary in proportion to the modulus of elasticity of the material of which they are composed, and therefore such tapes must be so selected that their relative changes in length due to any given pull shall equal their relative coefficients of expansion, and obviously this selection of material may be made based upon known characteristics of the different materials which may be employed. Fortunately, materials may be selected, as they have been in this case, in which the relative changes in length due to changes in tension, equal their relative changes in length due to changes in temperature, and such being the case, it is obvious that the compensator 30 will move to compensate for or take up such variations in length as it did before when the device was subjected to changes in temperature. For example, it has been found that steel having a coefficient of expansion of approximately .0000065 in deg. Fah. and phosphor bronze, spring temper, having a coefficient of expansion of approximately .000010 in deg. Fah., will satisfactorily coöperate.

Now, disregarding, from consideration, the effect of either changes of temperature or pull, and supposing that both are zero, and the tape is supported only at each end, it is obvious that the change of length due to sag or catenary, would be greater than if it were not only supported at each end, but were supported in the middle or at intermediate points. This change can be compensated for by so arranging the relative weight per unit of length of each tape that the extent of the variation due to such change in catenary will equal the change due to variations in temperature and tension, and therefore the compensator, when the two tapes are constructed according to the principles referred to, will automatically take up and compensate for changes in length due to this cause. Of course the means by which the unit weight can be ascertained are well within the technical skill of those skilled in the art, and this need not be discussed here. For instance it has been found in practice that the relative weight per unit of length of the bronze and steel above mentioned so nearly satisfies the requirements to make the effect of the sag in the catenary also proportional to their relative coefficients of expansion, that several practical means have proven available for making this relative weight meet the required conditions without sensibly altering either the coefficients of expansion, or modulus of elasticity. Thus it has been found by actual experience that nickel-plating one tape slightly heavier than the other will produce the desired result, and is a simple and satisfactory method.

The physical properties of steel and phosphor bronze tapes that have been found to successfully coöperate, may be described as follows:—

|  | Steel tape. | Phos. bronze tape. |
|---|---|---|
| Coeff. of expansion p. 1° F | .0000065S | .0000103 |
| Modulus of elasticity | 28730000 | 16500000 |
| Weight p. cu. inch | .2831 lbs. | .321 lbs. |
| Width of tape | .2475" | .250" |
| Thickness of tape | .014" | .0154" |
| Original weight p. inch of length | .000981 lbs. | .001236 lbs. |
| Final weight p. inch of length (nickeled) | .000997 lbs. | .00125 lbs. |

The result of the application of the principles stated in the described device is that no matter under what conditions of temperature, tension or sag the tapes are used, the distance between the index marks 16 and 32 will remain substantially constant.

In order to use portions of the tape shorter than its total length, there is provided a clamp indicated at 25 having an index 26. This clamp may be secured in any suitable manner at any place along the two tapes, rigidly to join them together at such place, and it is obvious that when so arranged, the effective distance to be measured is a distance between the index marks 26 and 32. It is also obvious that the form shown in Fig. 2 in which both tapes are jointed to a compensator at both ends does not depart from the principles of the invention.

I claim:—

1. A linear measuring device comprising a plurality of elongated members located side by side and connected together at both ends, said members being formed of materials having different coefficients of extension when placed under tension, one end connection of the member comprising a compensator so connected to the members as to be moved by the consequent variation of their extension when placed under tension, and spaced coacting indicating elements, one of which has connections with the elongated members, the other being connected to the compensator.

2. A linear measuring device comprising a plurality of elongated members having different coefficients of extension, spaced indicating elements having indexes, and means operated by the relative change in the members and connected to one of the indicating elements for maintaining the indexes at substantially a predetermined fixed distance apart.

3. A linear measuring device comprising a plurality of elongated members located side by side and connected together at their ends, said members having different coefficients of extension, spaced indicating elements one of which is mounted on the members, one of said end connections between the members comprising means connected to both members for supporting the other of the indicating elements and maintaining a part of it at a substantially fixed distance from a part of the coacting element irrespective of the relative change in the elongated members due to extension or contraction.

4. A linear measuring device comprising two tapes or the like having different coefficients of expansion and arranged substantially in parallel relation, means connecting the tapes together at one end, a compensator mounted on the tapes and having means by which it is moved by the relative change of the tapes under varying conditions of temperature and support, and indicating elements one of which is connected with the tapes, and one of which is carried by the compensator and has a part that is maintained thereby at substantially a fixed distance from a part of the other irrespective of the relative change of the tapes.

5. A linear measuring device comprising two tapes or the like of different materials arranged in parallel relation, means whereby the tapes are rigidly joined together at one end, a compensator joining the tapes at the other end and adapted to be moved by the tapes jointly under varying conditions, and coacting devices having indicating elements maintained at a substantially fixed distance apart by the compensator irrespective of the varying relation of the tapes.

6. A compensating tape comprising a plurality of linear measuring elements having different coefficients of expansion, and means connected with the elements and operated by the different amount of expansion of the measuring elements for automatically indicating substantially the same unit of length under varying conditions imposed on the linear measuring elements.

7. A linear measuring device comprising two tapes or the like of different materials arranged in parallel relation, means whereby they are rigidly joined at one end, a compensator having a pivotal connection with each of the tapes, and which compensator is moved around a center between the two pivots, as the two tapes change in length according to their respective coefficients of expansion, the perpendicular distances between the center line of each tape and a predetermined point on the compensator having a predetermined proportion to the coefficients of extension of the material of which each tape is composed.

8. A linear measuring device comprising two tapes of different materials arranged in parallel relation, means whereby they are rigidly joined together at one place, a compensator having a pivotal connection with each of the tapes, said compensator being moved around a center between the two pivots as the two tapes change in length according to their respective coefficients of expansion, the perpendicular distances between the medial line of each tape and a predetermined point on the compensator having a predetermined proportion to the modulus of elasticity of the materials of which each tape is composed.

9. A compensating tape comprising a plurality of linear measuring elements located side by side and connected together at both ends, said elements being constructed of material having different coefficients of expansion and being of predetermined relatively different cross sectional areas, whereby each element will move under conditions of tension and sag a length proportionate to its movement under variations of temperature.

10. A linear measuring device comprising measuring elements having different degrees of expansion under corresponding conditions, and devices connecting the elements at spaced points and including means operated by the relative variations in the lengths of the elements for automatically maintaining the indices a substantially fixed distance apart irrespective of the relative variations in length of said elements.

11. A linear measuring device comprising spaced indicating elements, having indexes, a plurality of connecting means extending substantially from one indicating element to the other and subject to variations in length, and a compensating means between the connecting means and one indicating element for maintaining a substantially fixed distance between the indexes irrespective of the variation in length of the connecting means due to their irrespective cœfficients of expansion.

In testimony whereof I affix my signature in presence of two witnesses.

BEN J. CAMPBELL.

Witnesses:
 CARL W. KEUFFEL,
 BOWDEWINE B. VAN SICKLE.

Copies of this patent may be obtained for five cents each, by addressing the "Commissioner of Patents, Washington, D. C."